(12) United States Patent
Lucas

(10) Patent No.: US 9,321,375 B2
(45) Date of Patent: Apr. 26, 2016

(54) VEHICLE SEAT APPARATUS HAVING SUSPENSION WITH INDEPENDENT ARMREST ADJUSTMENT

(71) Applicant: Sears Manufacturing Co., Davenport, IA (US)

(72) Inventor: Nicholas Lucas, Bettendorf, IA (US)

(73) Assignee: Sears Manufacturing Co., Davenport, IA (US)

( * ) Notice: Subject to any disclaimer, the term of this patent is extended or adjusted under 35 U.S.C. 154(b) by 220 days.

(21) Appl. No.: 13/927,471

(22) Filed: Jun. 26, 2013

(65) Prior Publication Data

US 2015/0001901 A1    Jan. 1, 2015

(51) Int. Cl.
  *B60N 2/46* (2006.01)
  *B60N 2/06* (2006.01)
  *B60N 2/08* (2006.01)

(52) U.S. Cl.
  CPC ............ *B60N 2/0825* (2013.01); *B60N 2/0856* (2013.01); *B60N 2/0881* (2013.01); *B60N 2/0893* (2013.01)

(58) Field of Classification Search
  CPC .. B60N 2/4646; B60N 2/0825; B60N 2/0856; B60N 2/0881; B60N 2/0893
  USPC .................. 297/344.1, 344.24, 411.35, 411.4
  See application file for complete search history.

(56) References Cited

U.S. PATENT DOCUMENTS

| | | | | |
|---|---|---|---|---|
| 4,176,878 A * | 12/1979 | Koutsky | ......................... | 297/115 |
| 4,183,493 A * | 1/1980 | Koutsky | ......................... | 248/430 |
| 4,241,893 A * | 12/1980 | Koutsky et al. | ............... | 248/425 |
| 5,975,639 A * | 11/1999 | Wilson et al. | ............ | 297/411.35 |
| 6,053,577 A * | 4/2000 | Arko et al. | ............... | 297/411.35 |
| 7,887,132 B2 * | 2/2011 | Link | ............................ | 297/327 |
| 2008/0100121 A1* | 5/2008 | Serber | .................... | A47C 1/023 |
| | | | | 297/452.1 |
| 2010/0006364 A1* | 1/2010 | Koutsky et al. | ............... | 180/329 |
| 2011/0248541 A1* | 10/2011 | Haubrich | ............ | B60N 2/4646 |
| | | | | 297/411.2 |

* cited by examiner

*Primary Examiner* — David R Dunn
*Assistant Examiner* — Tania Abraham
(74) *Attorney, Agent, or Firm* — Lane & Waterman LLP

(57) ABSTRACT

A vehicle seat apparatus comprising a base, a seat, a fore and aft seat adjustment mechanism, an armrest bracket, and a fore and aft armrest adjustment mechanism. The fore and aft seat adjustment mechanism connects the seat to the base and includes seat slide rails and spacers thereby defining a vertical space between the seat and seat slide rails. The armrest bracket is positioned below the seat in the vertical space between the seat and seat slide rails and includes side supports to which armrests or armrest associated components may be mounted. The bracket also has a plurality of slots positioned coincident with the spacers of the fore and aft seat adjustment mechanism. The fore and aft armrest adjustment mechanism connects the bracket to the seat and includes a pair of armrest slide rails, whereby the position of the armrest bracket relative to the seat may be adjusted.

1 Claim, 4 Drawing Sheets

VEHICLE SEAT APPARATUS HAVING SUSPENSION WITH INDEPENDENT ARMREST ADJUSTMENT

BACKGROUND

The present invention is directed generally to vehicle seating. More particularly, the invention is directed to a vehicle seat apparatus with a seat suspension having an independent armrest adjustment functionality.

It is now common in vehicle seat technology to provide mechanisms or systems that permit the fore and aft adjustment of seat armrests relative to the seat. Oftentimes, the seat will have both right and left armrests and each is adjustable to accommodate the specific needs or desires of the seat occupant. It is particularly desirable for the seat suspension to permit adjustment of the seat itself in the fore and aft directions, and, in addition, to permit adjustment of the armrests in the fore and aft directions and independently of the seat adjustment. This affords more selective adjustment and positioning of the seat and armrests. It is also important to provide this functionality in a simple and relatively inexpensive design, and to minimize the space or envelope required for the design.

SUMMARY OF THE INVENTION

The present invention is directed to a vehicle seat apparatus comprising a base, a seat, a fore and aft seat adjustment mechanism, an armrest bracket, and a fore and aft armrest adjustment mechanism. The base is mountable to the vehicle. The fore and aft seat adjustment mechanism connects the seat to the base and includes a pair of seat slide rails and a plurality of spacers thereby defining a vertical space between the seat and seat slide rails. The armrest bracket is positioned below the seat in the vertical space between the seat and seat slide rails and includes side supports to which armrests or associated armrest components may be mounted. The bracket also has a plurality of slots positioned coincident with the spacers of the fore and aft seat adjustment mechanism. The fore and aft armrest adjustment mechanism connects the bracket to the seat and includes a pair of armrest slide rails, whereby the position of the armrest bracket relative to the seat may be adjusted.

BRIEF DESCRIPTION OF THE DRAWINGS

The features of the present invention are set forth in the appended claims. However, the invention's embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
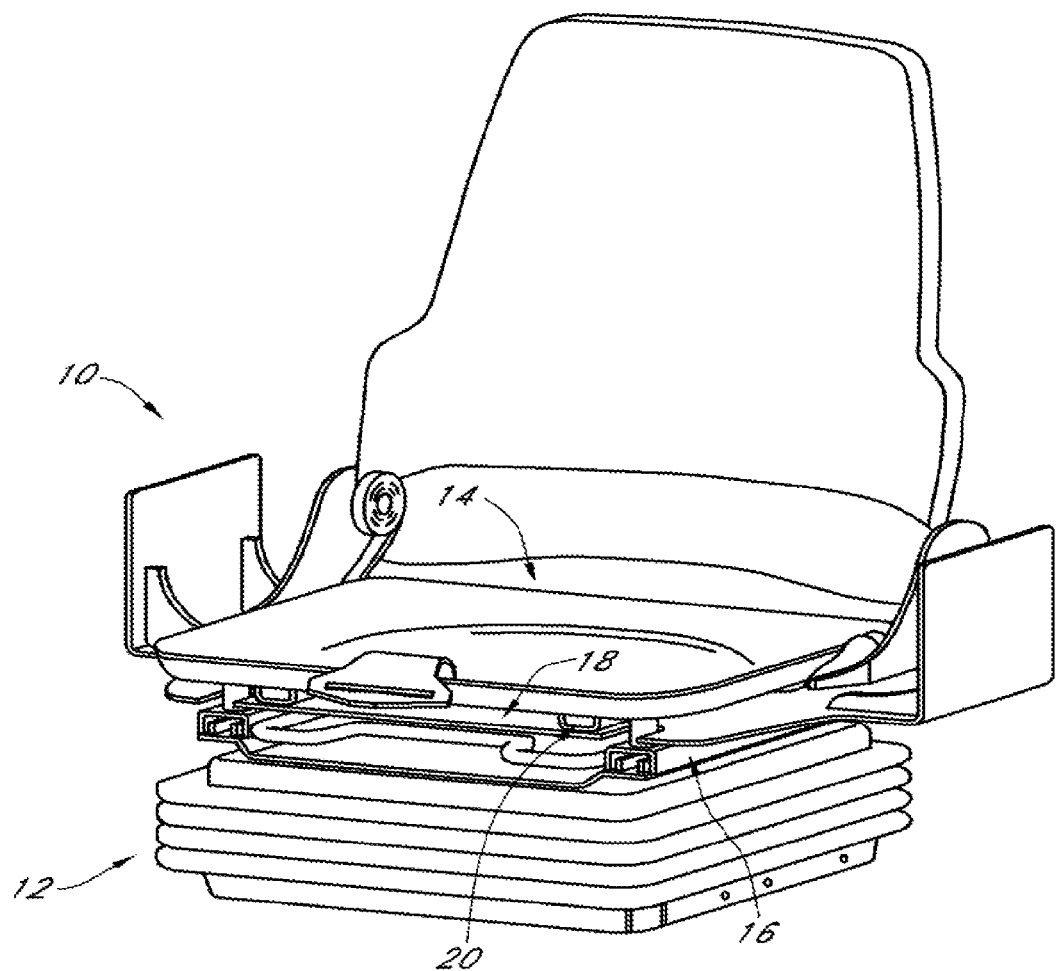
FIG. 1 is a perspective view illustrating one embodiment of the present invention.
Figure 2:
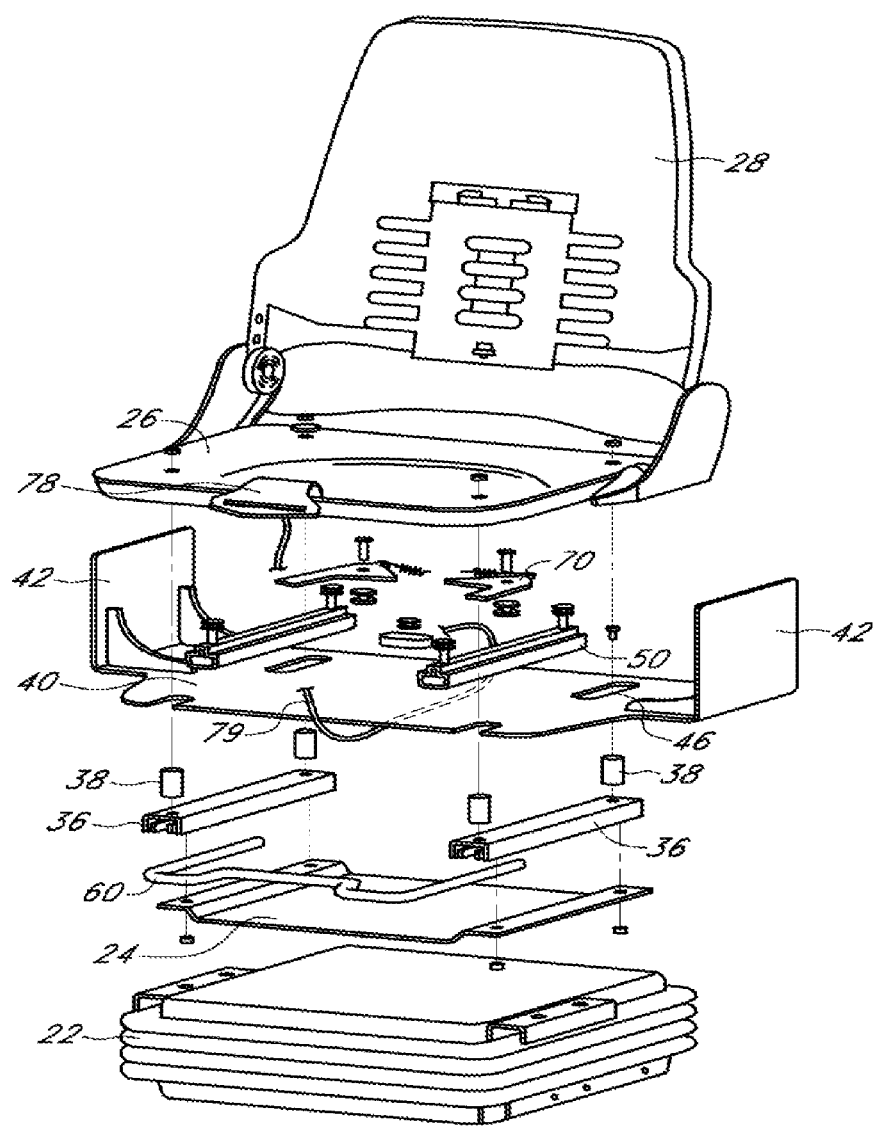
FIG. 2 is a front perspective and exploded view of the embodiment of the invention shown in FIG. 1, showing some of the components of the embodiment.
Figure 3:
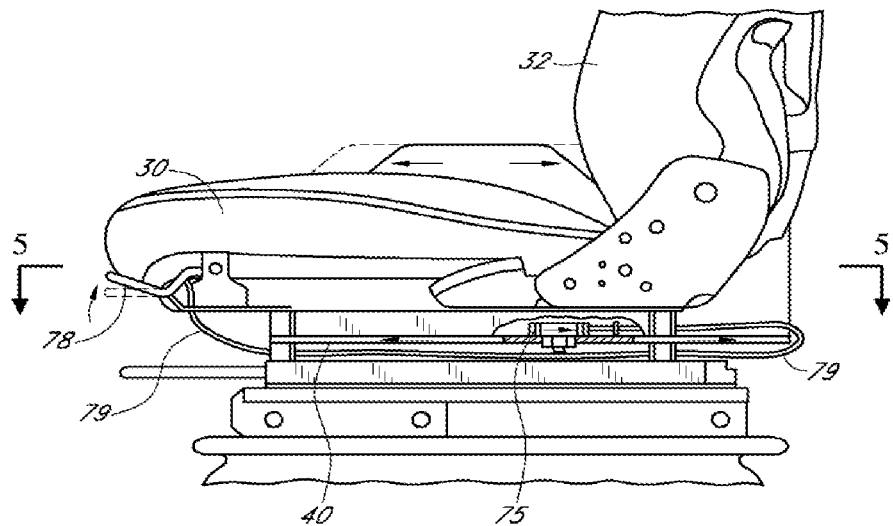
FIGS. 3 and 4 are side elevation views of the embodiment illustrated in FIG. 1 and showing various operations of the invention.

With reference to FIGS. 1 and 2, the improved seat apparatus of the present invention is designated generally as 10, and includes a base 12, a seat 14, a fore and aft seat adjustment mechanism 16, an armrest bracket 18 and a fore and aft armrest adjustment mechanism 20.

In the illustrated embodiment, the base 12 comprises an air bellows 22 having an upper support pan 24. The base, however, may take many different forms well known to those skilled in the art, including conventional scissors suspensions or other common linkage suspensions. The base 12 is typically mounted to the floor of the vehicle cab.

The seat 14 includes a seat pan 26 and a back rest pan 28 which support seat and back rest cushions, 30 and 32, respectively. Once again, however, the seat used in the present invention may take any of the great variety of designs well known in the art, and the particular seat configuration is not significant to the present invention.

The seat fore and aft adjustment mechanism 16 comprises a pair of seat slide rails 36 and a plurality of spacers 38. This adjustment mechanism connects the seat to the upper support pan of the base, and the spacers serve to elevate the seat relative to the base, to thereby define a space between the top of the base 12 and the bottom of the seat pan 26. The lower channels of the seat slide rails are fastened to the upper support pan 24 while the spacers 38 and upper channels of the seat slide rails are fastened to the seat pan 26.

The armrest bracket 18 is comprised of a generally planar panel 40 positioned in the space between the seat 14 and base 12. The panel 40 extends across the width of the seat and laterally beyond the sides of the seat. At each end, the panel 40 has an armrest support 42 to which an armrest or other associated armrest component may be mounted. It should be noted that in the context of the present invention, the terms "armrest" or "armrest associated components" are intended to include any structure intended to be positioned adjacent the seat in the location typically occupied by a conventional armrest. These terms are intended to include both armrests and consoles or instrument clusters and any other such structure without limitation. The armrest bracket 18 also includes a plurality of slots 46 located in panel 40 at locations coincident with the spacers 38, so that the spacers extend through slots 46.

The fore and aft armrest adjustment mechanism 20 includes a pair of armrest slide rails 50, with the upper channels of slide rails fastened to the bottom of the seat pan 26 and the lower channels fastened to the upper surface of panel 40. These slide rails, along with the slots 46 in panel 40, allow the armrest bracket to move fore and aft relative to the seat 20

Figure 4:
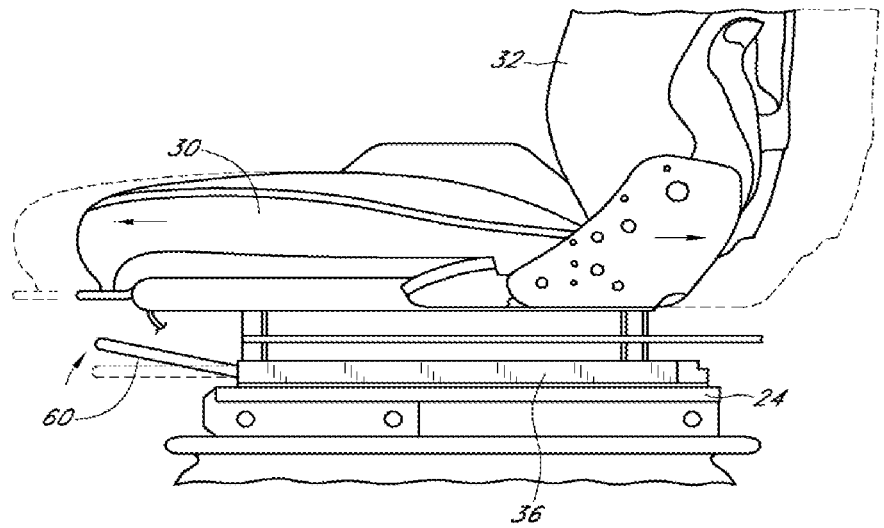

As is well known in the art, the fore and aft adjustment mechanisms 16 and 20 described above will also typically include some form of actuation device to unlock the slides, permitting fore and aft adjustment, and to then lock the slides in the selected position. There are many known components employed for this purpose in connection with seat adjustment, and examples of such components are illustrated in U.S. Pat. Nos. 4,183,493 and 8,240,764. Such components include a seat adjustment handle 60, which when properly manipulated allows the seat 14 to move fore or aft relative to the base, as illustrated in FIG. 4.

Figure 5:
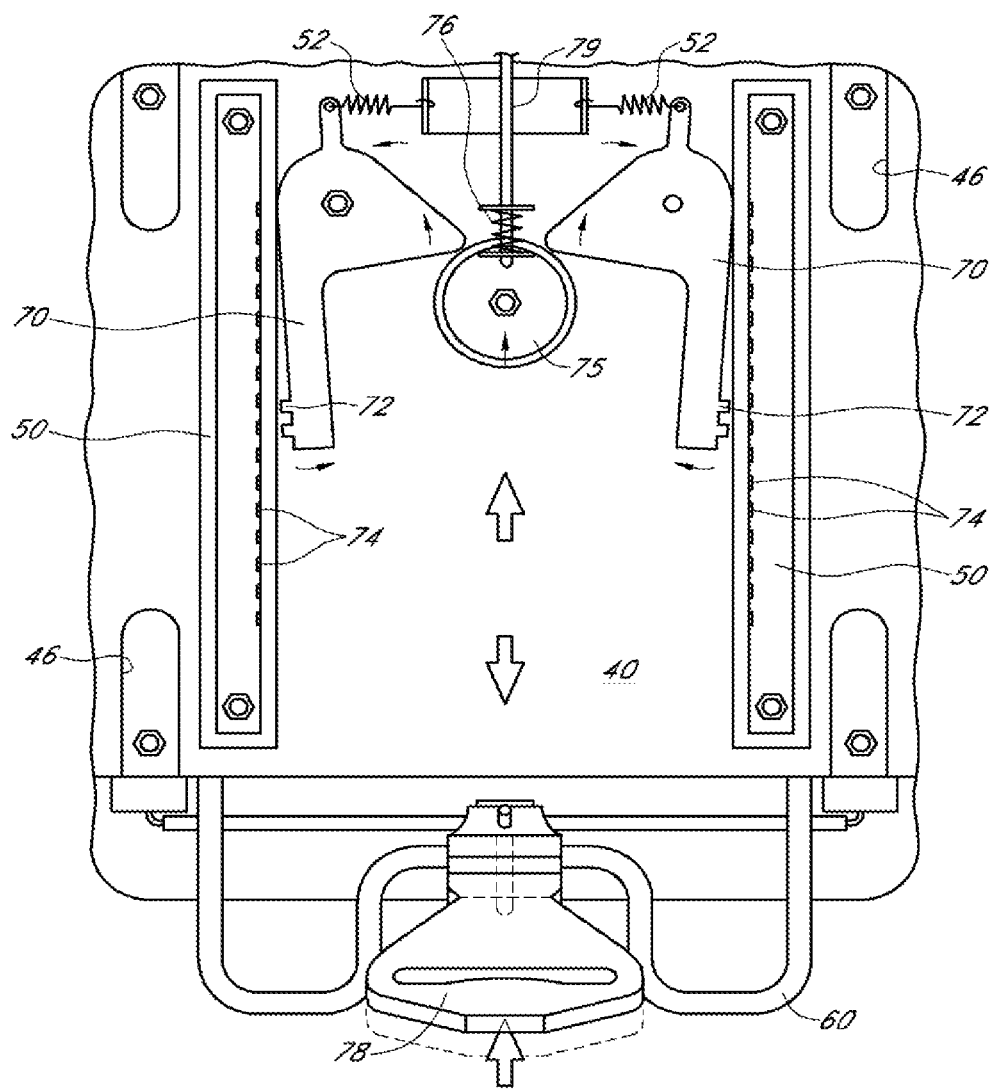
FIG. 5 is a cross section taken along line 5-5 of FIG. 3.

In accordance with an embodiment of the present invention and as illustrated in FIG. 5, a latching mechanism is employed to lock the armrest bracket 18 in a fixed fore and aft position relative to the seat 14. One embodiment of a suitable latching mechanism includes one or two latches 70 pivotally mounted to the armrest bracket panel 40. Each of the latches 70 has locking elements 72 that cooperate with mating locking elements 74 located in the upper channel of the armrest slide rails 50 which, in turn, is fastened to the underside of seat pan 26. The latches 70 are biased to the closed or locking position by means of latch springs 52. The latches 70 may be rotated from the locking position to an open or unlocking position by sliding a latch actuator or puck 75 rearward against the biasing force of actuator spring 76. The puck 75 is mounted into a small slot in panel 40. An armrest adjustment handle 78 is mounted to the front of seat pan 26 and is rotatable so that by pulling up on handle 78 a connecting cable 79 acts to move the actuation puck 75 rearward, thereby unlocking the armrest bracket to permit independent movement of the armrests relative to the seat and base.

The present invention provides a mechanically simple, small envelope and cost effective apparatus, giving the vehicle seat occupant substantial flexibility in the location of both the seat and the armrests or armrest associated components within the vehicle cab. It will be appreciated by those skilled in the art that various changes and modifications can be made to the illustrated embodiments without departing from the spirit of the present invention. All such modifications and changes are intended to be covered by the appended claims.

The invention claimed is:

1. A vehicle seat apparatus comprising:
a base mountable to a vehicle;
a seat;
a fore and aft seat adjustment mechanism connecting the seat to the base and including a pair of seat slide rails and a plurality of spacers thereby defining a vertical space between the seat and seat slide rails;
an armrest bracket positioned below the seat in the vertical space between the seat and seat slide rails and including side supports to which armrests or armrest associated components may be mounted, wherein the armrest bracket further includes a plurality of slots positioned coincident with the spacers of the fore and aft seat adjustment mechanism to accommodate fore and aft movement of the armrest bracket relative to the seat;
a fore and aft armrest adjustment mechanism connecting the bracket to the seat and including a pair of armrest slide rails, whereby the position of the armrest bracket relative to the seat may be adjusted; and
a latching mechanism to lock the position of the armrest bracket relative to the seat, said latching mechanism having at least one latch biased to lock the armrest bracket in fixed position and an actuation device cooperating with the latch to unlock the armrest bracket wherein the latching mechanism actuation device includes a sliding actuator and an armrest adjustment handle positioned at the front of the seat and movable to slide the actuator into engagement with the at least one latch to unlock the armrest bracket.

* * * * *